United States Patent
Wu

(10) Patent No.: US 10,924,772 B2
(45) Date of Patent: Feb. 16, 2021

(54) METHOD AND DEVICE FOR LIVE VIDEO BROADCAST

(71) Applicant: GUANGZHOU HUADUO NETWORK TECHNOLOGY CO., LTD., Guangdong (CN)

(72) Inventor: Hao Wu, Guangdong (CN)

(73) Assignee: GUANGZHOU HUADUO NETWORK TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 15/599,839

(22) Filed: May 19, 2017

(65) Prior Publication Data

US 2017/0257646 A1    Sep. 7, 2017

Related U.S. Application Data

(63) Continuation of application No. PCT/CN2014/095518, filed on Dec. 30, 2014.

(30) Foreign Application Priority Data

Nov. 20, 2014  (CN) .................. 201410670285.X

(51) Int. Cl.
*H04N 21/2187* (2011.01)
*H04N 21/24* (2011.01)
(Continued)

(52) U.S. Cl.
CPC ........ *H04N 21/2187* (2013.01); *H04H 20/18* (2013.01); *H04H 20/33* (2013.01);
(Continued)

(58) Field of Classification Search
CPC ......... H04N 21/2187; H04N 21/23103; H04N 21/23406; H04N 21/24; H04N 21/4788; H04H 20/33; H04H 20/18
See application file for complete search history.

(56) References Cited

U.S. PATENT DOCUMENTS

| 9,118,293 B1 * | 8/2015 | Zelenov .................. G06F 3/165 |
| 2007/0198839 A1 * | 8/2007 | Carle ...................... H04L 9/083 |
|  |  | 713/176 |

(Continued)

FOREIGN PATENT DOCUMENTS

| CN | 1455372 A | 11/2003 |
| CN | 1484167 A | 3/2004 |

(Continued)

*Primary Examiner* — Benjamin R Bruckart
*Assistant Examiner* — Akshay Doshi

(57) ABSTRACT

A method and device for live video broadcast is disclosed. The method includes: acquiring first live broadcast configuration information corresponding to a first process, and live broadcasting video streaming corresponding to the first process according to the first live broadcast configuration information; when it is detected that a running state of a second process is an activated state, acquiring second live broadcast configuration information corresponding to the second process, and detecting a relationship between the first process and the second process according to the first live broadcast configuration information and the second live broadcast configuration information; and when it is detected that the relationship between the first process and the second process is an association relationship, switching the live broadcasted video streaming corresponding to the first process for video streaming corresponding to the second process according to the second live broadcast configuration information.

12 Claims, 7 Drawing Sheets

(51) Int. Cl.
*H04H 20/18* (2008.01)
*H04H 20/33* (2008.01)
*H04N 21/231* (2011.01)
*H04N 21/4788* (2011.01)
*H04N 21/234* (2011.01)

(52) U.S. Cl.
CPC . *H04N 21/23103* (2013.01); *H04N 21/23406* (2013.01); *H04N 21/24* (2013.01); *H04N 21/4788* (2013.01)

(56) References Cited

U.S. PATENT DOCUMENTS

2013/0198792 A1* 8/2013 Wright .................. H04N 21/23
 725/116
2014/0297882 A1* 10/2014 Estrop .............. H04N 21/23439
 709/231

FOREIGN PATENT DOCUMENTS

| | | |
|---|---|---|
| CN | 101420610 A | 4/2009 |
| CN | 101484886 A | 7/2009 |
| CN | 101938628 A | 1/2011 |
| CN | 103227946 A | 7/2013 |
| CN | 103248929 A | 8/2013 |
| CN | 103618949 A | 3/2014 |
| KR | 10-2009-0100896 A | 9/2009 |
| KR | 10-2012-01011923 A | 9/2012 |

* cited by examiner

METHOD AND DEVICE FOR LIVE VIDEO BROADCAST

CROSS-REFERENCE TO RELATED APPLICATION(S)

This application is a continuation of International Patent Application PCT No. PCT/CN2014/095518 filed on Dec. 30, 2014, which claims priority to Chinese Patent Application No. 201410670285.X, filed on Nov. 20, 2014. The aforementioned patent applications are hereby incorporated by reference in their entireties.

TECHNICAL FIELD

The present disclosure relates to a technical field of the Internet, and more particularly, to a method and device for live video broadcast.

BACKGROUND

In recent years, comprehensive rich media clients integrating functions such as online singing, online live video broadcast, online live game broadcast, online live education broadcast and so forth were developing rapidly, such that an anchor user can upload live broadcasted video in a corresponding channel by an anchor client, and the audience can freely watch, by an audience client, the live broadcasted video uploaded by the anchor client.

Taking live game broadcast for example, when a game application has two processes, the anchor client can live broadcast the first process of the game application. When the game application initiates the second process, the anchor user should manually set again live broadcast parameters relating to the second process. And only when the live broadcast parameters of the second process have been set, the anchor client can live broadcast video streaming corresponding to the second process. In this case, the fluency of the live broadcast is inevitably affected, and operations by the anchor user becomes complicated.

BRIEF DESCRIPTION OF THE DRAWINGS

In order to more clearly describe technical solutions according to implementations of the present disclosure or in prior art, accompanying drawings used for describing the implementations or prior art will be briefly introduced hereinafter. Apparently, the accompanying drawings described below merely show some implementations of the present disclosure, and persons skilled in the art may also derive other accompanying drawings from these accompanying drawings without creative efforts.

DETAILED DESCRIPTION

In conjunction with the drawings in the implementations of the present disclosure, a clear, complete description for the technical solutions in the implementations of the present disclosure is provided below. Apparently, the described implementations are a part rather than all of the implementations of the present disclosure. All other implementations obtained by persons skilled in the art based on the implementations of the present disclosure without creative efforts should fall within the protection scope of the present disclosure.

Figure 1:
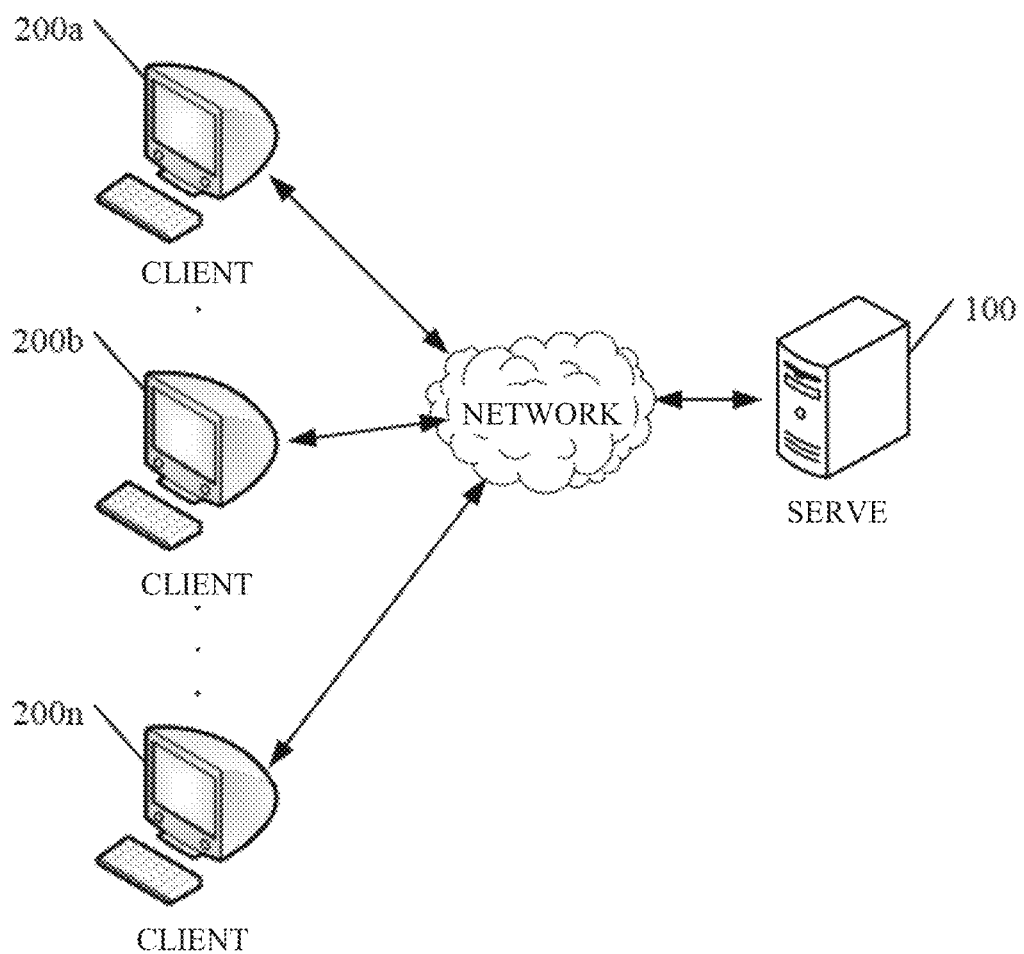
FIG. 1 is a schematic diagram of a network architecture according to an implementation of the present disclosure.

In order to better understand the method and device for live video broadcast disclosed by an implementation of the present disclosure, a network architecture in which the implementation of the present disclosure is applicable will be described below. Referring to FIG. 1, it is a schematic diagram of a network architecture disclosed by an implementation of the present disclosure. As illustrated in FIG. 1, the network architecture may include a server 100 and a plurality of clients. The server 100 is also referred to as a background server, a component server, and so on. The server 100 may communicate with a plurality of clients via the Internet. In the network architecture as illustrated in FIG. 1, a part of the plurality of clients may act as anchor clients, and the remaining clients may act as audience clients. The multiple anchor clients and the multiple audience clients may be in a same channel. In the implementation of the present disclosure, simply speaking, the channel is a virtual space (or a virtual room), and the audience clients in the virtual space can not only watch live broadcasted contents from the anchor clients, but also interact with the anchor clients by voice or text. The anchor clients have live broadcasting initiative. For example, the anchor clients have the initiative in uploading video. The uploaded video may be live broadcasted game video, performance video, education video and so forth. In the implementation of the present disclosure, either of the anchor client and the audience client may be a rich media client integrating functions such as group chat, live video broadcast, online singing, online game, online video and so forth. In the network architecture as illustrated in FIG. 1, the anchor client and the audience client may run on a user equipment including but not limited to a mobile phone, a mobile computer, a tablet computer, a personal digital assistant (PDA), a media player, a smart TV, a smart watch, a pair of smart glasses, a smart bracelet and so forth.

The client 200*a*, the client 200*b* . . . the client 200*n* and the server 100 in the network architecture according to the implementation of the present disclosure can be applied in the case of live video broadcast on the Internet. Taking the client 200*a* for example, the client 200*a* is an anchor client, and can acquire a preset live broadcast configuration list from the server 100. Then, the client 200*a* finds first live broadcast configuration information corresponding to a first process in the live broadcast configuration list, and live broadcasts video streaming corresponding to the first process according to the first live broadcast configuration information. When it is detected that a running state of a second process is an activated state, the client 200a further finds second live broadcast configuration information corresponding to the second process in the live broadcast configuration list. When it is detected that a relationship between the first process and the second process is an association relationship, the client 200a switches the live broadcasted video streaming corresponding to the first process for video streaming corresponding to the second process according to the second live broadcast configuration information, such that the anchor client can switch and live broadcast the process without manual operations by the anchor client, thereby ensuring the fluency of live broadcast and simplifying the operations by the anchor user. The process of the client 200a's live broadcasting the video streaming is that the client 200a transmits the intercepted video streaming to the server 100, and then the server 100 forwards the video streaming in real time to the plurality of audience clients in the same channel as the client 200a, so as to realize the live video streaming broadcast. The first process and the second process may belong to a same third-party application, or, the first process and the second process may belong to different third-party applications, respectively. The third-party application may be a game application.

Figure 2:
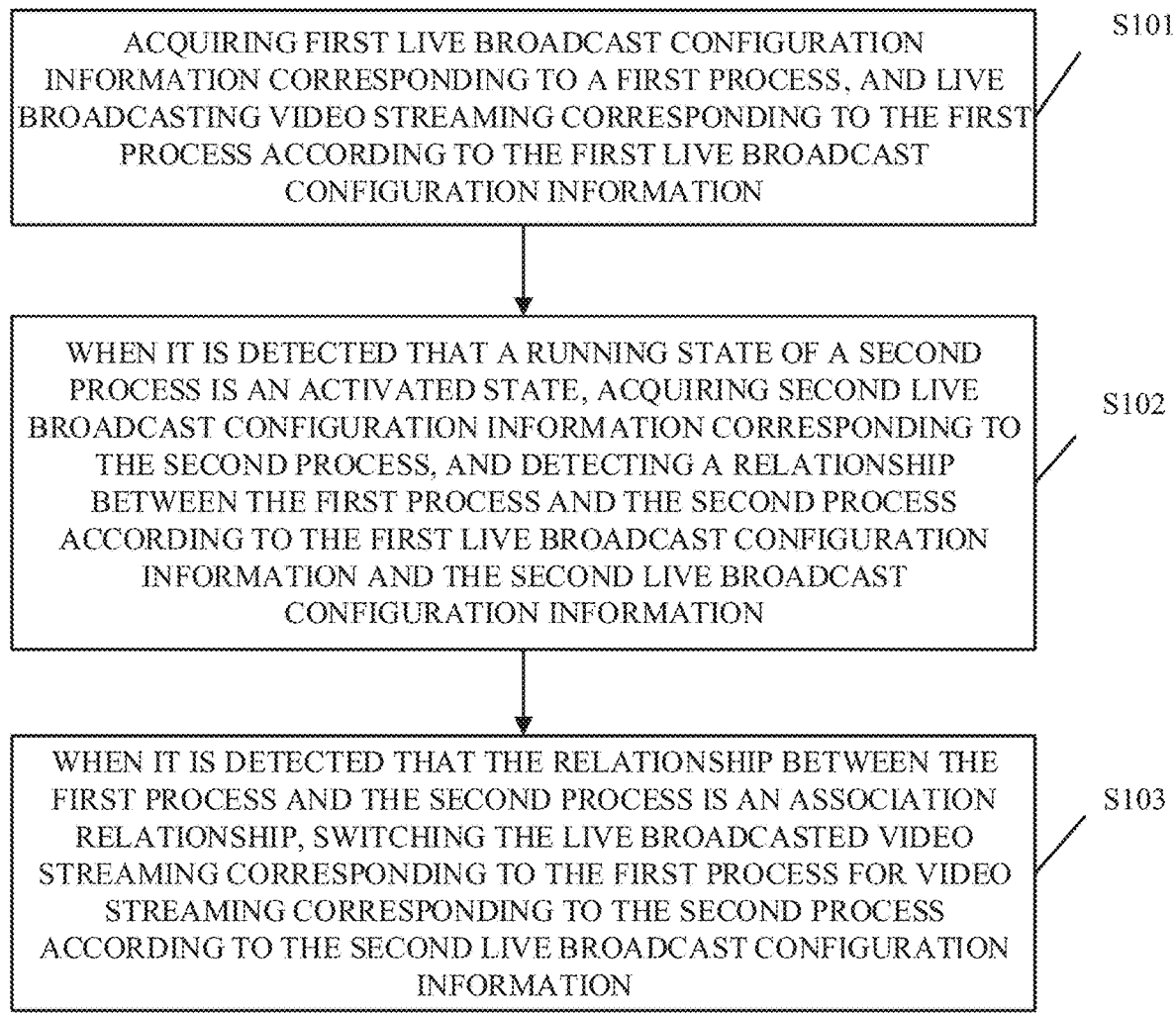
FIG. 2 is a flowchart of a method for live video broadcast according to an implementation of the present disclosure.

Based on the network architecture as illustrated in FIG. 1, a flowchart of a method for live video broadcast is disclosed by an implementation of the present disclosure. Referring to FIG. 2 which is a flowchart of a method for live video broadcast according to an implementation of the present disclosure, the method includes steps S101 to S103.

The step S101 is acquiring first live broadcast configuration information corresponding to a first process, and live broadcasting video streaming corresponding to the first process according to the first live broadcast configuration information.

Specifically, the anchor client acquires a preset live broadcast configuration list from the server at first, and then finds the first live broadcast configuration information corresponding to the first process in the live broadcast configuration list. The live broadcast configuration list may include a live broadcast configuration information corresponding to multiple processes, and the first live broadcast configuration information is one of multiple pieces of live broadcast configuration information in the live broadcast configuration list. The live broadcast configuration list is stored in advance in the server. The multiple pieces of live broadcast configuration information in the live broadcast configuration list are also preset, and one process corresponds to one piece of live broadcast configuration information. The first live broadcast configuration information may at least include a video capturing mode corresponding to the first process, identification information of the first process and identification information of a first associated process having an association relationship with the first process. The first process may be one of processes of a third-party application which may be a game application. The identification information of the first process includes a process name of the first process and/or an identification code of the first process. The identification information of the first associated process includes a process name of the first associated process and/or an identification code of the first associated process. The video capturing mode may include a desktop capturing mode, a process capturing mode, and other capturing modes. The desktop capturing mode refers to capturing displayed contents in a display area in the desktop as video streaming to be live broadcasted. The process capturing mode refers to embedding DLL (Dynamic Link Library) into a process of the third-party application so as to intercept video images corresponding to the process. After the first live broadcast configuration information corresponding to the first process is acquired, the video streaming corresponding to the first process may be acquired and live broadcasted in the video capturing mode corresponding to the first process and being in the first live broadcast configuration information.

The step S102 is, when it is detected that a running state of a second process is an activated state, acquiring second live broadcast configuration information corresponding to the second process, and detecting a relationship between the first process and the second process according to the first live broadcast configuration information and the second live broadcast configuration information.

Specifically, when the second process has been initiated and an anchor user operates an interface corresponding to the second process, it can be detected that the running state of the second process is the activated state. At this time, the second live broadcast configuration information corresponding to the second process can be acquired from the preset live broadcast configuration list. The first process and the second process may belong to a same third-party application, or the first process and the second process may belong to different third-party applications, respectively. The third-party application may be a game application. For example, the first process and the second process belong to the same third-party application, and when the anchor user clicks a button in an interface corresponding to the first process, the third-party application will initiate the second process, and the running state of the second process will become the activated state.

The second live broadcast configuration information may at least include a video capturing mode corresponding to the second process, identification information of the second process and identification information of a second associated process having an association relationship with the second process. The identification information of the second process includes a process name of the second process and/or an identification code of the second process. The identification information of the second associated process includes a process name of the second associated process and/or an identification code of the second associated process. Detecting a relationship between the first process and the second process according to the first live broadcast configuration information and the second live broadcast configuration information, includes: detecting whether the identification information of the first associated process in the first live broadcast configuration information is matched with the identification information of the second process in the second live broadcast configuration information; when the identification information of the first associated process is matched with the identification information of the second process, determining that the relationship between the first process and the second process is an association relationship; and when the identification information of the first associated process is not matched with the identification information of the second process, determining that the relationship between the first process and the second process is not an association relationship.

The step S103 is, when it is detected that the relationship between the first process and the second process is an association relationship, switching the live broadcasted video streaming corresponding to the first process for video streaming corresponding to the second process according to the second live broadcast configuration information.

Specifically, when it is detected in the step S102 that the relationship between the first process and the second process is the association relationship, the video streaming corresponding to the first process can be temporarily stopped from being live broadcasted, and the video streaming corresponding to the second process are acquired and live broadcasted in the video capturing mode corresponding to the second process and being in the second live broadcast configuration information, that is, the live broadcasted video streaming corresponding to the first process is switched for the video streaming corresponding to the second process according to the second live broadcast configuration information.

In at least one implementation, if one of the two processes is to be switched for the other, the automatic switching process as described in the steps S101 to S103 can be realized by setting a corresponding association relationship between the two processes on the server side. For example, identification code of a process A is XXA, identification code of a process B is XXB, and when the process A is to be switched for the process B to perform the live broadcast, identification code of an associated process having an association relationship with the process A can be preset as XXB on the server side; when the process B is to be switched for the process A to perform the live broadcast, identification code of an associated process having an association relationship with the process B can be preset as XXA on the server side. Furthermore, when multiple processes are to be switched freely for each other, the relationship between the multiple processes can also be set on the server side, such that when one of any two of the multiple processes are to be switched for the other, the automatic switching process as described in the steps S101 to S103 can be realized.

Taking a game named League of Legends for example, first live broadcast configuration information corresponding to a first process may be set by using a first XML statement containing <g><game id="2863" exe="LeagueClient-Ux.exe" spec_desktop_capture="1" next_id_list="19" wnd_name_list="League of Legends" /></g>, and second live broadcast configuration information corresponding to a second process may be set by using a second XML statement containing <g><game id="19" exe="League of Legends.exe" next_id_list="2863" /></g>, before the game is live broadcasted. These two processes can be associated with each other by means of the next_id_list in each of the two XML statements.

When the first process named LeagueClientUx.exe is initiated, the program, according to the process name of the first process, finds that the game id in the first XML statement is 2863, then searches for the next_id_list and discovers that the first associated process has a game id of 19.

When the anchor operates the first process and then initiates the game (i.e., initiates the second process named League of Legends.exe), the program, according to the process name of the second process, finds that the game id in the second XML statement is 19 which is consistent with the next_id_list in the first XML statement. At this time, capture of images of the first process is stopped and is dynamically switched for capture of images of the second process.

The spec_desktop_capture set as 1 in the first XML statement means that the game is live broadcasted in the desktop capturing mode, otherwise in the process capturing mode. The wnd_name_list means a name of a window to be captured. The program searches for the video streaming to be captured, according to the name of the window, only when the spec_desktop_capture is set as 1.

In the implementation of the present disclosure, firstly the video streaming corresponding to the first process is live broadcasted according to the first live broadcast configuration information, and then, when it is detected that the relationship between the first process and the second process is the association relationship, the live broadcasted video streaming corresponding to the first process is switched for the video streaming corresponding to the second process according to the second live broadcast configuration information, such that the anchor client can switch and live broadcast the process without manual operations by the anchor user, thereby ensuring the fluency of the live broadcast and simplifying the operations by the anchor user.

Figure 3:
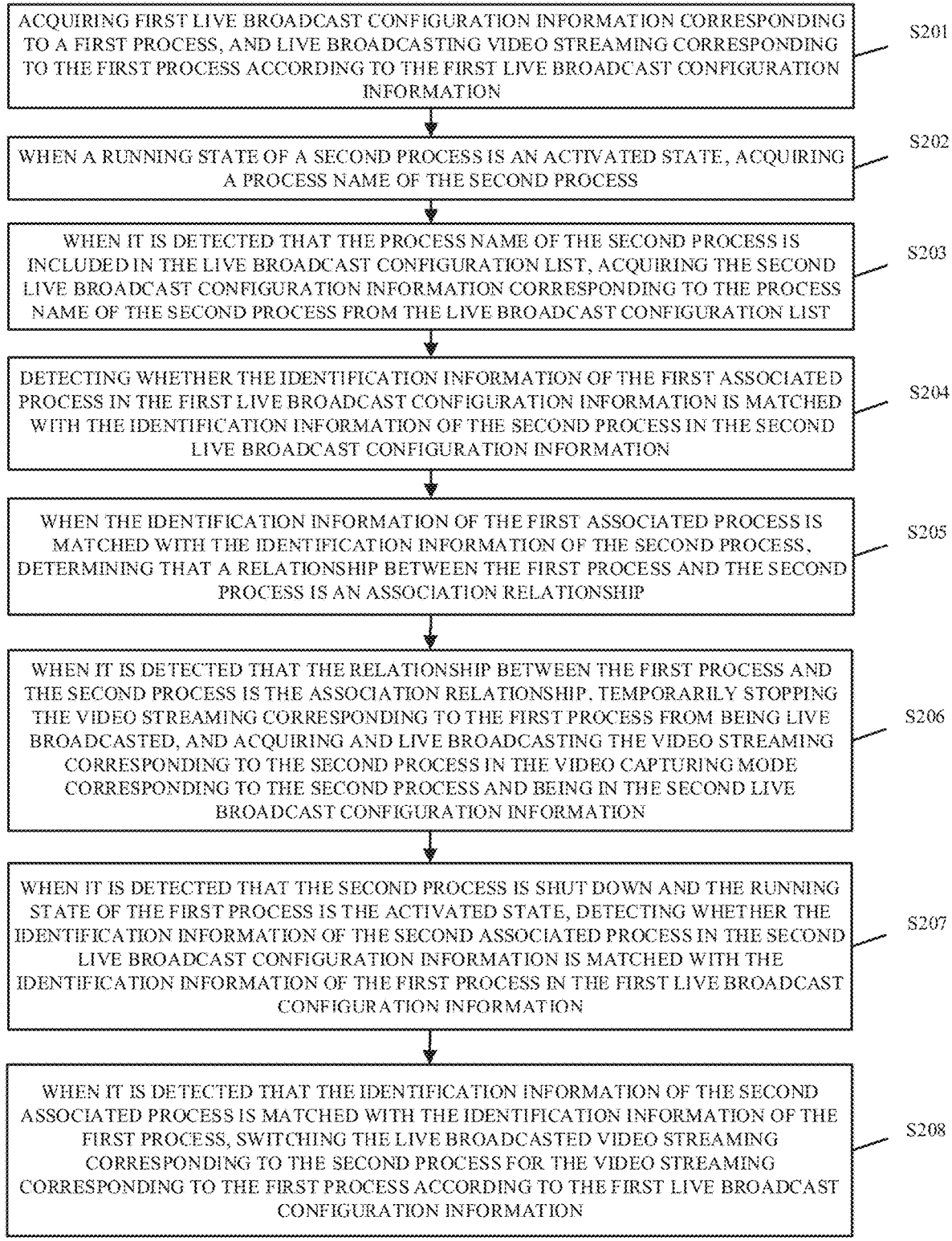
FIG. 3 is a flowchart of another method for live video broadcast according to an implementation of the present disclosure.

Based on the network architecture as illustrated in FIG. 1, a flowchart of another method for live video broadcast is disclosed by an implementation of the present disclosure. Referring to FIG. 3 which is a flowchart of another method for live video broadcast according to an implementation of the present disclosure, the method includes following steps S201 to S208.

The step S201 is acquiring first live broadcast configuration information corresponding to a first process, and live broadcasting video streaming corresponding to the first process according to the first live broadcast configuration information.

Specifically, the anchor client acquires a preset live broadcast configuration list from the server, and then finds the first live broadcast configuration information corresponding to the first process in the live broadcast configuration list. The live broadcast configuration list may include live broadcast configuration information corresponding to multiple processes, and the first live broadcast configuration information is one of multiple pieces of live broadcast configuration information in the live broadcast configuration list. The live broadcast configuration list is stored in advance in the server. The multiple pieces of live broadcast configuration information in the live broadcast configuration list are also preset, and one process corresponds to one piece of live broadcast configuration information. The first live broadcast configuration information may at least include a video capturing mode corresponding to the first process, identification information of the first process and identification information of a first associated process having an association relationship with the first process. The first process may be one of processes of a third-party application which may be a game application. The identification information of the first process includes a process name of the first process and/or an identification code of the first process. The identification information of the first associated process includes a process name of the first associated process and/or an identification code of the first associated process. The video capturing mode may include a desktop capturing mode, a process capturing mode, and other capturing modes. The desktop capturing mode refers to capturing displayed contents in a display area in the desktop as video streaming to be live broadcasted. The process capturing mode refers to embedding DLL into a process of the third-party application so as to intercept video images corresponding to the process. After the first live broadcast configuration information corresponding to the first process is acquired, the video streaming corresponding to the first process may be acquired and live broadcasted in the video capturing mode corresponding to the first process and being in the first live broadcast configuration information.

The step S202 is, when a running state of a second process is an activated state, acquiring a process name of the second process.

Specifically, when the second process has been initiated and an anchor user operates an interface corresponding to the second process, it can be detected that the running state of the second process is the activated state. At this time, the process name of the second process can be acquired.

The step S203 is, when it is detected that the process name of the second process is included in the live broadcast configuration list, acquiring the second live broadcast configuration information corresponding to the process name of the second process from the live broadcast configuration list.

Specifically, when it is detected that the process name of the second process is included in the live broadcast configuration list, it is indicated that the second live broadcast configuration information is one of multiple pieces of live broadcast configuration information in the live broadcast configuration list. At this time, the second live broadcast configuration information corresponding to the process name of the second process can be acquired from the live broadcast configuration list. When it is detected that the process name of the second process is not in the live broadcast configuration list, it is indicated that the third-party application corresponding to the second process does not meet live broadcast requirements, and the anchor client will not live broadcast the second process. The first process and the second process may belong to a same third-party application, or the first process and the second process may belong to different third-party applications, respectively. The third-party application may be a game application. The second live broadcast configuration information may at least include a video capturing mode corresponding to the second process, identification information of the second process and identification information of a second associated process having an association relationship with the second process. The identification information of the second process includes a process name of the second process and/or an identification code of the second process. The identification information of the second associated process includes a process name of the second associated process and/or an identification code of the second associated process.

The step S204 is detecting whether the identification information of the first associated process in the first live broadcast configuration information is matched with the identification information of the second process in the second live broadcast configuration information.

Specifically, after the second live broadcast configuration information is acquired, it can be detected whether the identification information of the first associated process in the first live broadcast configuration information is matched with the identification information of the second process in the second live broadcast configuration information. The detecting process may include: detecting whether the process name of the first associated process is identical with the process name of the second process; when the process name of the first associated process is identical with the process name of the second process, the identification information of the first associated process is matched with the identification information of the second process; when the process name of the first associated process is not identical with the process name of the second process, the identification information of the first associated process is not matched with the identification information of the second process; or detecting whether the identification code of the first associated process is identical with the identification code of the second process; when the identification code of the first associated process is identical with the identification code of the second process, the identification information of the first associated process is matched with the identification information of the second process; when the identification code of the first associated process is not identical with the identification code of the second process, the identification information of the first associated process is not matched with the identification information of the second process.

The step S205 is, when the identification information of the first associated process is matched with the identification information of the second process, determining that a relationship between the first process and the second process is an association relationship.

Specifically, when the identification information of the first associated process is matched with the identification information of the second process, it is indicated that the identification information of the first associated process is identical with the identification information of the second process, and it can be determined that the relationship between the first process and the second process is the association relationship. When the identification information of the first associated process is not matched with the identification information of the second process, it can be determined that the relationship between the first process and the second process is not the association relationship, and at this time, the first process and the second process are not to be switched for each other.

The step S206 is, when it is detected that the relationship between the first process and the second process is the association relationship, temporarily stopping the video streaming corresponding to the first process from being live broadcasted, and acquiring and live broadcasting the video streaming corresponding to the second process in the video capturing mode corresponding to the second process and being in the second live broadcast configuration information.

Specifically, when it is detected that the relationship between the first process and the second process is the association relationship, the video streaming corresponding to the first process can be temporarily stopped from being live broadcasted, and the video streaming corresponding to the second process are acquired and live broadcasted in the video capturing mode corresponding to the second process and being in the second live broadcast configuration information, that is, switching the live broadcasted video streaming corresponding to the first process for the video streaming corresponding to the second process is realized.

The step S207 is, when it is detected that the second process is shut down and the running state of the first process is the activated state, detecting whether the identification information of the second associated process in the second live broadcast configuration information is matched with the identification information of the first process in the first live broadcast configuration information.

Specifically, when it is detected that the second process is shut down, the running state of the first process may be detected firstly. When the running state of the first process is the activated state, it is indicated that after the second process is shut down, the video streaming corresponding to the first process is displayed in the primary desktop. When the first process does not exist or the running state of the first process is not the activated state, it is unallowable to switch back for the first process to perform the live broadcast. When it is detected that the second process is shut down and the running state of the first process is the activated state, it may be detected whether the identification information of the second associated process in the second live broadcast configuration information is matched with the identification information of the first process in the first live broadcast configuration information. The detecting process may include: detecting whether the process name of the second associated process is identical with the process name of the first process; when the process name of the second associated process is identical with the process name of the first process, the identification information of the second associated process is matched with the identification information of the first process; when the process name of the second associated process is not identical with the process name of the first process, the identification information of the second associated process is not matched with the identification information of the first process; or detecting whether the identification code of the second associated process is identical with the identification code of the first process; when the identification code of the second associated process is identical with the identification code of the first process, the identification information of the second associated process is matched with the identification information of the first process; when the identification code of the second associated process is not identical with the identification code of the first process, the identification information of the second associated process is not matched with the identification information of the first process.

The step S208 is, when it is detected that the identification information of the second associated process is matched with the identification information of the first process, switching the live broadcasted video streaming corresponding to the second process for the video streaming corresponding to the first process according to the first live broadcast configuration information.

Specifically, when it is detected in the step S207 that the identification information of the second associated process is matched with the identification information of the first process, the video streaming corresponding to the second process can be temporarily stopped from being live broadcasted, and the video streaming corresponding to the first process are acquired and live broadcasted in the video capturing mode corresponding to the first process and being in the first live broadcast configuration information. When it is detected in the step S207 that the identification information of the second associated process is not matched with the identification information of the first process, the anchor client does not resume the live broadcast of the first process.

In at least one implementation, if one of the two processes is to be switched for the other, the automatic switching process as described in the steps S201 to S208 can be realized by setting a corresponding association relationship between the two processes on the server side. For example, identification code of a process A is XXA, identification code of a process B is XXB, and when the process A is to be switched for the process B to perform the live broadcast, identification code of an associated process having an association relationship with the process A can be preset as XXB on the server side; when the process B is to be switched for the process A to perform the live broadcast, identification code of an associated process having an association relationship with the process B can be preset as XXA on the server side. Furthermore, when multiple processes are to be switched freely for each other, the relationship between the multiple processes can also be set on the server side, such that when one of any two of the multiple processes are to be switched for the other, the automatic switching process as described in the steps S201 to S208 can be realized.

Taking a game named League of Legends for example, first live broadcast configuration information corresponding to a first process may be set by using a first XML statement containing <g><game id="2863" exe="LeagueClientUx.exe" spec_desktop_capture="1" next_id_list="19" wnd_name_list="League of Legends" /></g>, and second live broadcast configuration information corresponding to a second process may be set by using a second XML statement containing <g><game id="19" exe="League of Legends.exe" next_id_list="2863" /></g>, before the game is live broadcasted. These two processes can be associated with each other by means of the next_id_list in each of the two XML statements.

When the first process named LeagueClientUx.exe is initiated, the program, according to the process name of the first process, finds that the game id in the first XML statement is 2863, then searches for the next_id_list and discovers that the first associated process has a game id of 19.

When the anchor operates the first process and then initiates the game (i.e., initiates the second process named League of Legends.exe), the program, according to the process name of the second process, finds that the game id in the second XML statement is 19 which is consistent with the next_id_list in the first XML statement. At this time, capture of images of the first process is stopped and is dynamically switched for capture of images of the second process.

The spec_desktop_capture set as 1 in the first XML statement means that the game is live broadcasted in the desktop capturing mode, otherwise in the process capturing mode. The wnd_name_list means a name of a window to be captured. The program searches for the video streaming to be captured, according to the name of the window, only when the spec_desktop_capture is set as 1.

In the implementation of the present disclosure, firstly the video streaming corresponding to the first process is live broadcasted according to the first live broadcast configuration information, and then, when it is detected that the relationship between the first process and the second process is an association relationship, the live broadcasted video streaming corresponding to the first process is switched for the video streaming corresponding to the second process according to the second live broadcast configuration information, such that the anchor client can switch and live broadcast the process without manual operations by the anchor user, thereby ensuring the fluency of the live broadcast and simplifying the operations by the anchor user.

Figure 4:
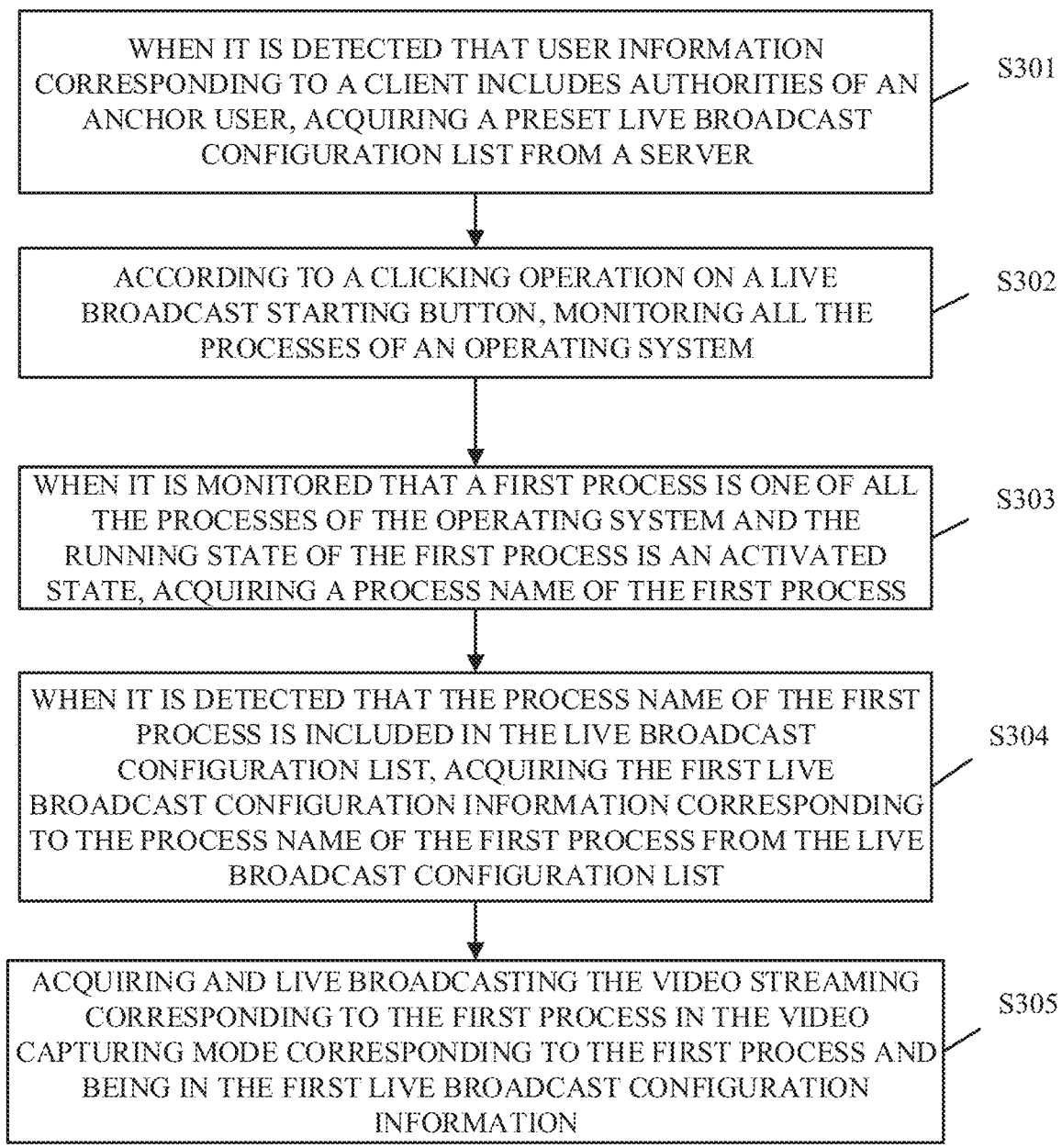
FIG. 4 is a flowchart of one of methods for live broadcasting a first process according to an implementation of the present disclosure.

Furthermore, referring FIG. 4 which is a flowchart of one of methods for live broadcasting the first process according to an implementation of the present disclosure. The method of the implementation of the present disclosure may correspond to the step S101 in the implementation as illustrated in FIG. 2 or the step S201 in the implementation as illustrated in FIG. 3. The method of the implementation of the present disclosure includes following steps S301 to S305.

The step S301 is, when it is detected that user information corresponding to a client includes authorities of an anchor user, acquiring a preset live broadcast configuration list from a server.

Specifically, when the anchor user logs in with a corresponding account via an anchor client, the anchor client can detect the user information corresponding to the account, that is to say, detect the user information corresponding to the client. When it is detected that the user information corresponding to the client includes authorities of the anchor user, the anchor client can acquire the preset live broadcast configuration list from the server.

The step S302 is, according to a clicking operation on a live broadcast starting button, monitoring all the processes of an operating system.

Specifically, when the anchor user logs in with the corresponding account via the anchor client, the anchor client can further display the live broadcast starting button. When the anchor user clicks the live broadcast starting button, the anchor client can notify a terminal where the client is installed to mount a global hook according to the clicking operation on the live broadcast starting button, so as to monitor all the processes of the operating system.

The step S303 is, when it is monitored that a first process is one of all the processes of the operating system and the running state of the first process is an activated state, acquiring a process name of the first process.

Specifically, when the anchor user initiates the first process and is operating a third-party application corresponding to the first process, the terminal where the anchor client is installed can monitor that the first process is one of all the processes of the operating system and the running state of the first process is the activated state. At this time, the anchor client can acquire the process name of the first process from all the processes.

The step S304 is, when it is detected that the process name of the first process is included in the live broadcast configuration list, acquiring the first live broadcast configuration information corresponding to the process name of the first process from the live broadcast configuration list.

Specifically, when it is detected that the process name of the first process is included in the live broadcast configuration list, it is indicated that the first live broadcast configuration information is one of multiple pieces of live broadcast configuration information in the live broadcast configuration list. At this time, the first live broadcast configuration information corresponding to the process name of the first process can be acquired from the live broadcast configuration list. The first live broadcast configuration information may at least include a video capturing mode corresponding to the first process, identification information of the first process and identification information of a first associated process having an association relationship with the first process.

The step S305 is acquiring and live broadcasting the video streaming corresponding to the first process in the video capturing mode corresponding to the first process and being in the first live broadcast configuration information.

Specifically, after the first live broadcast configuration information is acquired, the video streaming corresponding to the first process can be acquired and live broadcasted in the video capturing mode corresponding to the first process and being in the first live broadcast configuration information. The video capturing mode may include a desktop capturing mode, a process capturing mode, and other capturing modes.

According to the implementation of the present disclosure, by means of presetting the live broadcast configuration list, acquiring the corresponding first live broadcast configuration information from the live broadcast configuration list according to the first process, and then live broadcasting the video streaming corresponding to the first process according to the first live broadcast configuration information, the process of live broadcasting the first process can be simplified, operation steps can be reduced when the anchor user sets live parameters.

Figure 5:
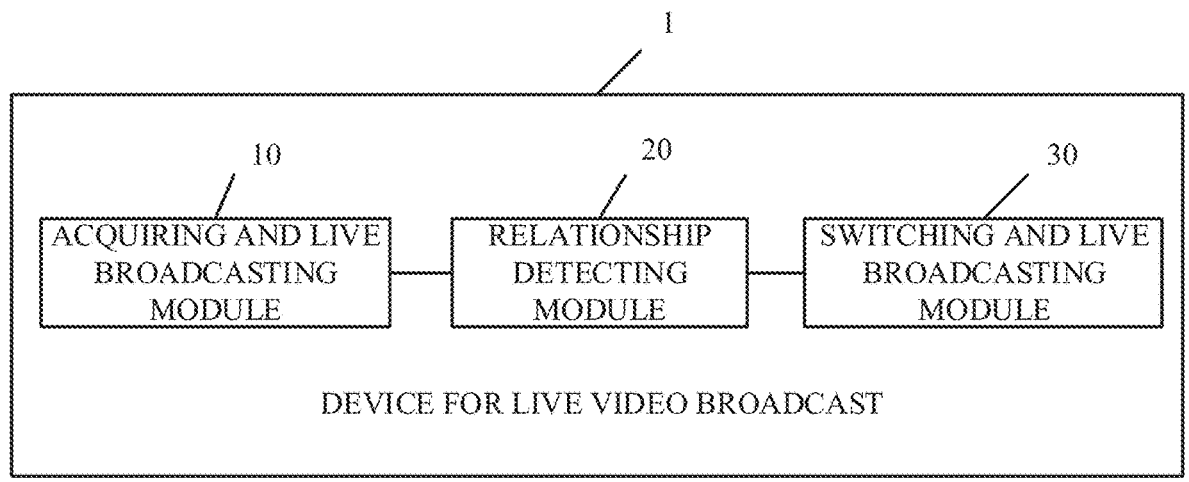
FIG. 5 is a schematic structural diagram of a device for live video broadcast according to an implementation of the present disclosure.

Based on the network architecture as illustrated in FIG. 1, a schematic structural diagram of a device 1 for live video broadcast is disclosed by an implementation of the present disclosure. Referring to FIG. 5 which is a schematic structural diagram of a device 1 for live video broadcast according to an implementation of the present disclosure, the device 1 for live video broadcast is applicable in an anchor client. The device 1 for live video broadcast may include an acquiring and live broadcasting module 10, a relationship detecting module 20 and a switching and live broadcasting module 30.

The acquiring and live broadcasting module 10 is configured for acquiring first live broadcast configuration information corresponding to a first process, and live broadcasting video streaming corresponding to the first process according to the first live broadcast configuration information.

Specifically, the acquiring and live broadcasting module 10 acquires a preset live broadcast configuration list from the server at first, and then finds the first live broadcast configuration information corresponding to the first process in the live broadcast configuration list. The live broadcast configuration list may include live broadcast configuration information corresponding to multiple processes, and the first live broadcast configuration information is one of multiple pieces of live broadcast configuration information in the live broadcast configuration list. The live broadcast configuration list is stored in advance in the server. The multiple pieces of live broadcast configuration information in the live broadcast configuration list are also preset, and one process corresponds to one piece of live broadcast configuration information. The first live broadcast configuration information may at least include a video capturing mode corresponding to the first process, identification information of the first process and identification information of a first associated process having an association relationship with the first process. The first process may be one of processes of a third-party application which may be a game application. The identification information of the first process includes a process name of the first process and/or an identification code of the first process. The identification information of the first associated process includes a process name of the first associated process and/or an identification code of the first associated process. The video capturing mode may include a desktop capturing mode, a process capturing mode, and other capturing modes. The desktop capturing mode refers to capturing displayed contents in a display area in the desktop as video streaming to be live broadcasted. The process capturing mode refers to embedding DLL into a process of the third-party application so as to intercept video images corresponding to the process. After the acquiring and live broadcasting module 10 acquires the first live broadcast configuration information corresponding to the first process, the acquiring and live broadcasting module 10 may acquire and live broadcast the video streaming corresponding to the first process in the video capturing mode corresponding to the first process and being in the first live broadcast configuration information.

The relationship detecting module 20 is configured for, when it is detected that a running state of a second process is an activated state, acquiring second live broadcast configuration information corresponding to the second process, and detecting a relationship between the first process and the second process according to the first live broadcast configuration information and the second live broadcast configuration information.

Specifically, when the second process has been initiated and an anchor user operates an interface corresponding to the second process, the relationship detecting module 20 can detect that the running state of the second process is the activated state. At this time, the relationship detecting module 20 can acquire the second live broadcast configuration information corresponding to the second process from the preset live broadcast configuration list. The first process and the second process may belong to a same third-party application, or the first process and the second process may belong to different third-party applications, respectively. The third-party application may be a game application.

The second live broadcast configuration information may at least include a video capturing mode corresponding to the second process, identification information of the second process and identification information of a second associated process having an association relationship with the second process. The identification information of the second process includes a process name of the second process and/or an identification code of the second process. The identification information of the second associated process includes a process name of the second associated process and/or an identification code of the second associated process. The relationship detecting module 20 detects whether the identification information of the first associated process in the first live broadcast configuration information is matched with the identification information of the second process in the second live broadcast configuration information; when the identification information of the first associated process is matched with the identification information of the second process, the relationship detecting module 20 can determines that the relationship between the first process and the second process is an association relationship; and when the identification information of the first associated process is not matched with the identification information of the second process, the relationship detecting module 20 can determine that the relationship between the first process and the second process is not an association relationship.

The switching and live broadcasting module 30 is configured for, when it is detected that the relationship between the first process and the second process is an association relationship, switching the live broadcasted video streaming corresponding to the first process for video streaming corresponding to the second process according to the second live broadcast configuration information.

Specifically, when it is detected that the relationship between the first process and the second process is the association relationship, the switching and live broadcasting module 30 is configured for temporarily stopping the video streaming corresponding to the first process from being live broadcasted, acquiring and live broadcasting the video streaming corresponding to the second process in the video capturing mode corresponding to the second process and being in the second live broadcast configuration information, that is, switching the live broadcasted video streaming corresponding to the first process for the video streaming corresponding to the second process according to the second live broadcast configuration information.

In at least one implementation, the relationship detecting module 20 is further configured for, when it is detected that the second process is shut down and the running state of the first process is the activated state, detecting whether the identification information of the second associated process in the second live broadcast configuration information is matched with the identification information of the first process in the first live broadcast configuration information.

Specifically, when it is detected that the second process is shut down, the relationship detecting module 20 may detect firstly the running state of the first process. When the running state of the first process is the activated state, it is indicated that after the second process is shut down, the video streaming corresponding to the first process is displayed in the primary desktop. When the first process does not exist or the running state of the first process is not the activated state, it is unallowable to switch back for the first process to perform the live broadcast. When it is detected that the second process is shut down and the running state of the first process is the activated state, the relationship detecting module 20 may detect whether the identification information of the second associated process in the second live broadcast configuration information is matched with the identification information of the first process in the first live broadcast configuration information. The detecting process may be that the relationship detecting module 20 detects whether the process name of the second associated process is identical with the process name of the first process; when the process name of the second associated process is identical with the process name of the first process, the identification information of the second associated process is matched with the identification information of the first process; when the process name of the second associated process is not identical with the process name of the first process, the identification information of the second associated process is not matched with the identification information of the first process; or the relationship detecting module 20 detects whether the identification code of the second associated process is identical with the identification code of the first process; when the identification code of the second associated process is identical with the identification code of the first process, the identification information of the second associated process is matched with the identification information of the first process; when the identification code of the second associated process is not identical with the identification code of the first process, the identification information of the second associated process is not matched with the identification information of the first process.

The switching and live broadcasting module 30 is further configured for, when it is detected that the identification information of the second associated process is matched with the identification information of the first process, switching the live broadcasted video streaming corresponding to the second process for the video streaming corresponding to the first process according to the first live broadcast configuration information.

Specifically, when it is detected that the identification information of the second associated process is matched with the identification information of the first process, the switching and live broadcasting module 30 can temporarily stop the video streaming corresponding to the second process from being live broadcasted, acquire and live broadcast the video streaming corresponding to the first process in the video capturing mode corresponding to the first process and being in the first live broadcast configuration information. When it is detected that the identification information of the second associated process is not matched with the identification information of the first process, the switching and live broadcasting module 30 does not resume the live broadcast of the first process.

Figure 6:
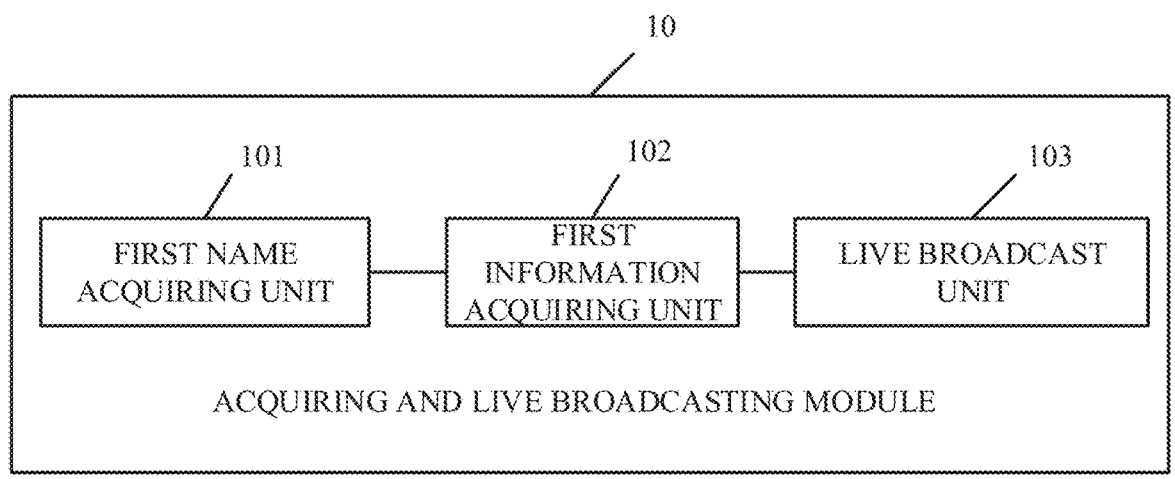
FIG. 6 is a schematic structural diagram of an acquiring and live broadcasting module according to an implementation of the present disclosure.

Furthermore, referring to FIG. 6 which is a schematic structural diagram of an acquiring and live broadcasting module 10 according to an implementation of the present disclosure, the acquiring and live broadcasting module 10 may include a first name acquiring unit 101, a first information acquiring unit 102 and a live broadcast unit 103.

The first name acquiring unit 101 is configured for acquiring the preset live broadcast configuration list from the server and acquiring a process name of the first process.

Specifically, when the anchor user logs in the anchor client, the first name acquiring unit 101 can acquire the preset live broadcast configuration list from the server and acquire the process name of the first process.

The first information acquiring unit 102 is configured for, when it is detected that the process name of the first process is included in the live broadcast configuration list, acquiring the first live broadcast configuration information corresponding to the process name of the first process from the live broadcast configuration list.

Specifically, when it is detected that the process name of the first process is included in the live broadcast configuration list, it is indicated that the first live broadcast configuration information is one of multiple pieces of live broadcast configuration information in the live broadcast configuration list. At this time, the first information acquiring unit 102 can acquire the first live broadcast configuration information corresponding to the process name of the first process from the live broadcast configuration list.

The live broadcast unit 103 is configured for acquiring and live broadcasting the video streaming corresponding to the first process in the video capturing mode corresponding to the first process and being in the first live broadcast configuration information.

Specifically, after the first information acquiring unit 102 acquires the first live broadcast configuration information, the live broadcast unit 103 can acquire and live broadcast the video streaming corresponding to the first process in the video capturing mode corresponding to the first process and being in the first live broadcast configuration information. The video capturing mode may include a desktop capturing mode, a process capturing mode, and other capturing modes.

Figure 7:
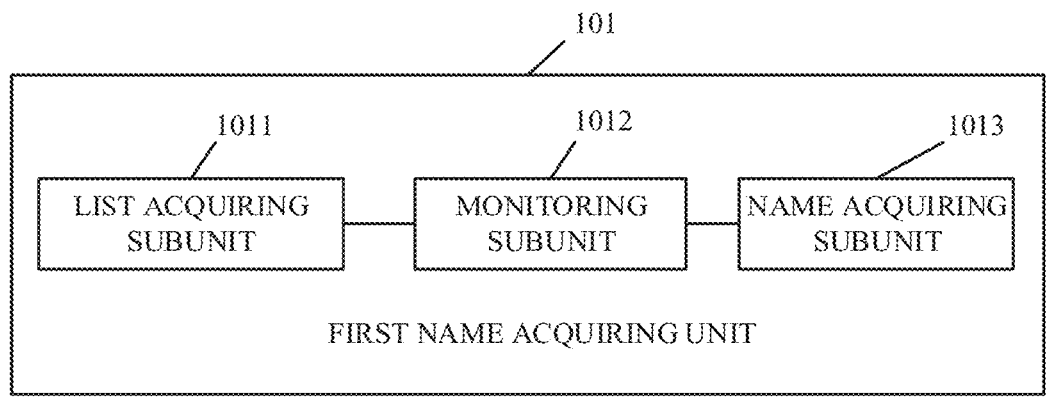
FIG. 7 is a schematic structural diagram of a first name acquiring unit according to an implementation of the present disclosure.

Furthermore, referring to FIG. 7 which is a schematic structural diagram of a first name acquiring unit 101 according to an implementation of the present disclosure, the first name acquiring unit 101 may include a list acquiring subunit 1011, a monitoring subunit 1012 and a name acquiring subunit 1013.

The list acquiring subunit 1011 is configured for, when it is detected that user information corresponding to a client includes authorities of an anchor user, acquiring the preset live broadcast configuration list from the server.

Specifically, when the anchor user logs in with a corresponding account via an anchor client, the anchor client can detect the user information corresponding to the account, that is to say, detect the user information corresponding to the client. When it is detected that the user information corresponding to the client includes authorities of the anchor user, the list acquiring subunit 1011 can acquire the preset live broadcast configuration list from the server.

The monitoring subunit 1012 is configured for, according to a clicking operation on a live broadcast starting button, monitoring all the processes of an operating system.

Specifically, when the anchor user logs in with the corresponding account via the anchor client, the anchor client can further display the live broadcast starting button. When the anchor user clicks the live broadcast starting button, the monitoring subunit 1012 can notify a terminal where the client is installed to mount a global hook according to the clicking operation on the live broadcast starting button, so as to monitor all the processes of the operating system.

The name acquiring subunit 1013 is configured for, when it is monitored that a first process is one of all the processes of the operating system and the running state of the first process is the activated state, acquiring the process name of the first process.

Specifically, when the anchor user initiates the first process and is operating a third-party application corresponding to the first process, the monitoring subunit 1012 can monitor that the first process is one of all the processes of the operating system and the running state of the first process is the activated state. At this time, the name acquiring subunit 1013 can acquire the process name of the first process from all the processes.

Figure 8:
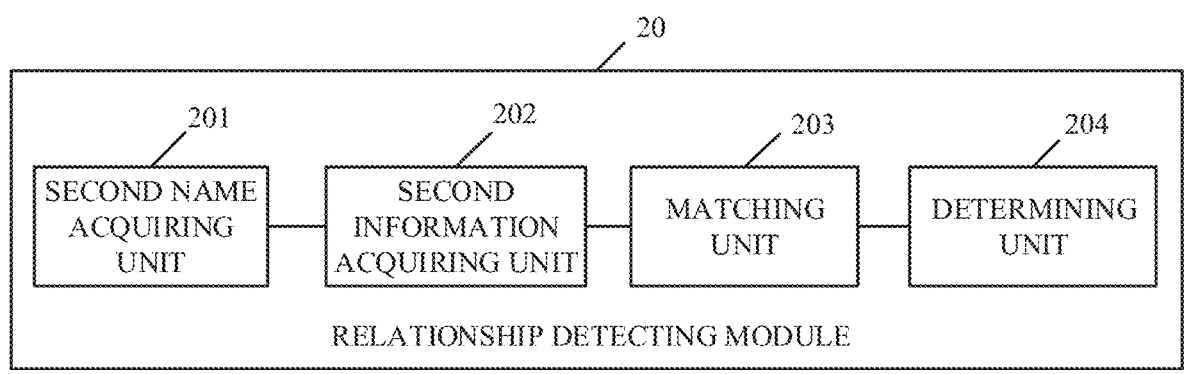
FIG. 8 is a schematic structural diagram of a relationship detecting module according to an implementation of the present disclosure.

Furthermore, referring to FIG. 8 which is a schematic structural diagram of a relationship detecting module 20 according to an implementation of the present disclosure, the relationship detecting module 20 may include a second name acquiring unit 201, a second information acquiring unit 202, a matching unit 203 and a determining unit 204.

The second name acquiring unit 201 is configured for, when the running state of the second process is the activated state, acquiring a process name of the first process.

Specifically, when the second process has been initiated and an anchor user operates an interface corresponding to the second process, it can be detected that the running state of the second process is the activated state. At this time, the second name acquiring unit 201 can acquire the process name of the second process.

The second information acquiring unit 202 is configured for, when it is detected that the process name of the second process is included in the live broadcast configuration list, acquiring the second live broadcast configuration information corresponding to the process name of the second process from the live broadcast configuration list.

Specifically, when it is detected that the process name of the second process is included in the live broadcast configuration list, it is indicated that the second live broadcast configuration information is one of multiple pieces of live broadcast configuration information in the live broadcast configuration list. At this time, the second information acquiring unit 202 can acquire the second live broadcast configuration information corresponding to the process name of the second process from the live broadcast configuration list. When it is detected that the process name of the second process is not in the live broadcast configuration list, it is indicated that the third-party application corresponding to the second process does not meet live broadcast requirements, and the anchor client will not live broadcast the second process.

The matching unit 203 is configured for detecting whether the identification information of the first associated process in the first live broadcast configuration information is matched with the identification information of the second process in the second live broadcast configuration information.

Specifically, after the second information acquiring unit 202 acquires the second live broadcast configuration information, the matching unit 203 can detect whether the identification information of the first associated process in the first live broadcast configuration information is matched with the identification information of the second process in the second live broadcast configuration information. The detecting process may be that the matching unit 203 detects whether the process name of the first associated process is identical with the process name of the second process; when the process name of the first associated process is identical with the process name of the second process, the identification information of the first associated process is matched with the identification information of the second process; when the process name of the first associated process is not identical with the process name of the second process, the identification information of the first associated process is not matched with the identification information of the second process; or the matching unit 203 detects whether the identification code of the first associated process is identical with the identification code of the second process; when the identification code of the first associated process is identical with the identification code of the second process, the identification information of the first associated process is matched with the identification information of the second process; when the identification code of the first associated process is not identical with the identification code of the second process, the identification information of the first associated process is not matched with the identification information of the second process.

The determining unit 204 is configured for, when the identification information of the first associated process is matched with the identification information of the second process, determining that the relationship between the first process and the second process is the association relationship.

Specifically, when the identification information of the first associated process is matched with the identification information of the second process, it is indicated that the identification information of the first associated process is identical with the identification information of the second process, and the determining unit 204 can determine that the relationship between the first process and the second process is the association relationship. When the identification information of the first associated process is not matched with the identification information of the second process, the determining unit 204 can determine that the relationship between the first process and the second process is not the association relationship, and at this time, the first process and the second process are not to be switched for each other.

In the implementation of the present disclosure, firstly the video streaming corresponding to the first process is live broadcasted according to the first live broadcast configuration information, and then, when it is detected that the relationship between the first process and the second process is the association relationship, the live broadcasted video streaming corresponding to the first process is switched for the video streaming corresponding to the second process according to the second live broadcast configuration information, such that the anchor client can switch and live broadcast the process without manual operations by the anchor user, thereby ensuring the fluency of the live broadcast and simplifying the operations by the anchor user.

It should be understood by persons skilled in the art that all or a part of the flowcharts in methods of the foregoing implementations may be accomplished by means of one or more computer-readable program codes instructing relevant hardware. The one or more computer program codes may be stored in a computer-readable storage medium. The one or more computer program codes may include the flowchart of the each foregoing method implementation when being executed. The storage medium may be a magnetic disk, an optical disc, a read-only memory (ROM), a random access memory (RAM), or the like.

Figure 9:
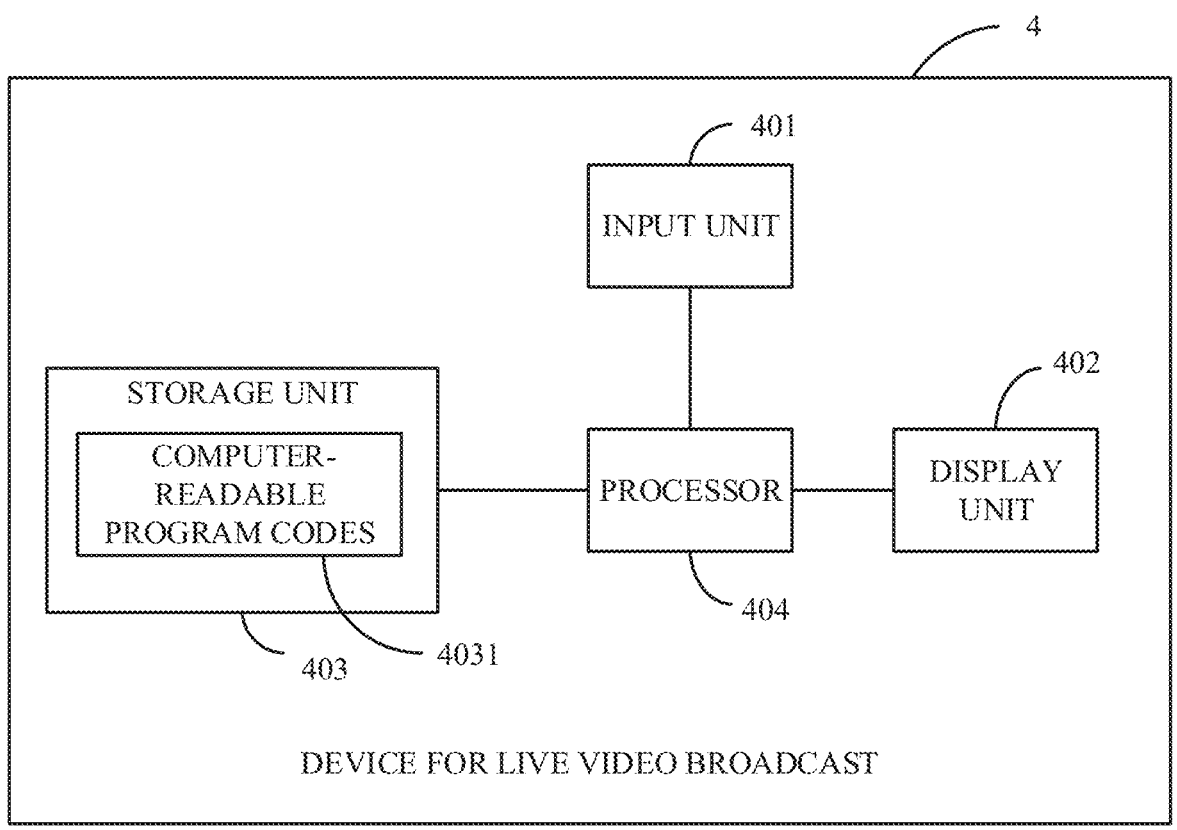
FIG. 9 is a schematic structural diagram of a device for live video broadcast according to an implementation of the present disclosure.

Based on the network architecture as illustrated in FIG. 1, a schematic structural diagram of a device 4 for live video broadcast is disclosed by an implementation of the present disclosure. Referring to FIG. 9 which is a schematic structural diagram of a device 4 for live video broadcast according to an implementation of the present disclosure, the device 4 for live video broadcast is applicable in an anchor client. The device 4 for live video broadcast may include an input unit 401, a display unit 402, a storage unit 403, and a processor 404. The input unit 401, the display unit 402, and the storage unit 403 are electrically connected to the processor 404.

The input unit 401 is configured for inputting information, such as letters. The input unit 401 may be but not limited to a physical keyboard, a touch-screen, or a combination of the physical keyboard and the touch-screen.

The display unit 402 is configured for displaying visual information, such as texts, images. The display unit 402 may be an LED display screen.

The storage unit 403 is configured for storing one or more computer-readable program codes 4031. The storage unit 403 can be a read only memory (ROM), a random access memory (RAM), a USB-disk, a removable hard disk, and so forth.

The processor 404 can include multiple cores for multi-thread or parallel processing and is configured to execute the one or more computer-readable program codes 4031 to: acquire first live broadcast configuration information corresponding to a first process, and live broadcast video streaming corresponding to the first process according to the first live broadcast configuration information; when it is detected that a running state of a second process is an activated state, acquire second live broadcast configuration information corresponding to the second process, and detect a relationship between the first process and the second process according to the first live broadcast configuration information and the second live broadcast configuration information; and when it is detected that the relationship between the first process and the second process is an association relationship, switch the live broadcasted video streaming corresponding to the first process for video streaming corresponding to the second process according to the second live broadcast configuration information.

Furthermore, the first live broadcast configuration information at least includes a video capturing mode corresponding to the first process, identification information of the first process and identification information of a first associated process having an association relationship with the first process; and the second live broadcast configuration information at least includes a video capturing mode corresponding to the second process, identification information of the second process and identification information of a second associated process having an association relationship with the second process.

Furthermore, acquiring the first live broadcast configuration information corresponding to the first process, and live broadcasting the video streaming corresponding to the first process according to the first live broadcast configuration information, comprises: acquiring a preset live broadcast configuration list from a server and acquiring a process name of the first process; when it is detected that the process name of the first process is included in the live broadcast configuration list, acquiring the first live broadcast configuration information corresponding to the process name of the first process from the live broadcast configuration list; and acquiring and live broadcasting the video streaming corresponding to the first process in the video capturing mode corresponding to the first process and being in the first live broadcast configuration information.

Furthermore, acquiring the preset live broadcast configuration list from the server and acquiring the process name of the first process, comprises: when it is detected that user information corresponding to a client includes authorities of an anchor user, acquiring the preset live broadcast configuration list from the server; according to a clicking operation on a live broadcast starting button, monitoring all the processes of an operating system; and when it is monitored that the first process is one of all the processes of the operating system and the running state of the first process is the activated state, acquiring the process name of the first process.

Furthermore, when it is detected that the running state of the second process is the activated state, acquiring the second live broadcast configuration information corresponding to the second process, and detecting the relationship between the first process and the second process according to the first live broadcast configuration information and the second live broadcast configuration information, comprises: when the running state of the second process is the activated state, acquiring a process name of the second process; when it is detected that the process name of the second process is included in the live broadcast configuration list, acquiring the second live broadcast configuration information corresponding to the process name of the second process from the live broadcast configuration list; detecting whether the identification information of the first associated process in the first live broadcast configuration information is matched with the identification information of the second process in the second live broadcast configuration information; and when the identification information of the first associated process is matched with the identification information of the second process, determining that the relationship between the first process and the second process is the association relationship.

Furthermore, when it is detected that the relationship between the first process and the second process is the association relationship, switching the live broadcasted video streaming corresponding to the first process for the video streaming corresponding to the second process according to the second live broadcast configuration information, comprises: when it is detected that the relationship between the first process and the second process is the association relationship, temporarily stopping the video streaming corresponding to the first process from being live broadcasted, and acquiring and live broadcasting the video streaming corresponding to the second process in the video capturing mode corresponding to the second process and being in the second live broadcast configuration information.

Furthermore, after the processor 404 being configured to execute the one or more computer-readable program codes 4031 to, when it is detected that the relationship between the first process and the second process is the association relationship, switching the live broadcasted video streaming corresponding to the first process for the video streaming corresponding to the second process according to the second live broadcast configuration information, the processor 404 being further configured to execute the one or more computer-readable program codes 4031 to: when it is detected that the second process is shut down and the running state of the first process is the activated state, detect whether the identification information of the second associated process in the second live broadcast configuration information is matched with the identification information of the first process in the first live broadcast configuration information; and when it is detected that the identification information of the second associated process is matched with the identification information of the first process, switch the live broadcasted video streaming corresponding to the second process for the video streaming corresponding to the first process according to the first live broadcast configuration information.

In the implementation of the present disclosure, firstly the video streaming corresponding to the first process is live broadcasted according to the first live broadcast configuration information, and then, when it is detected that the relationship between the first process and the second process is the association relationship, the live broadcasted video streaming corresponding to the first process is switched for the video streaming corresponding to the second process according to the second live broadcast configuration information, such that the anchor client can switch and live broadcast the process without manual operations by the anchor user, thereby ensuring the fluency of the live broadcast and simplifying the operations by the anchor user.

The foregoing implementations are merely preferable implementations of the present disclosure and are not intended to limit the scope of the claims of the present disclosure. Any equivalent variance made according to the claims of the present disclosure shall fall within the scope of the present disclosure.

What is claimed is:

1. A method for live video broadcast, comprising:
   acquiring first live broadcast configuration information corresponding to a first process, and live broadcasting video streaming corresponding to the first process according to the first live broadcast configuration information, wherein the first process belongs to a first application, the first live broadcast configuration information comprises a video capturing mode corresponding to the first process, identification information of the first process, and identification information of a first associated process having an association relationship with the first process, and the first associated process belongs to the first application;
   when a running state of a second process is an activated state, acquiring second live broadcast configuration information corresponding to the second process, wherein the second process belongs to a second application, the second live broadcast configuration information comprises a video capturing mode corresponding to the second process and identification information of the second process, and detecting a relationship between the first process and the second process according to the first live broadcast configuration information and the second live broadcast configuration information; and
   when the relationship between the first process and the second process is an association relationship, switching the live broadcasted video streaming corresponding to the first process for video streaming corresponding to the second process according to the second live broadcast configuration information,
   wherein the relationship between the first process and the second process is the association relationship when the identification information of the first associated process is matched with the identification information of the second process, the first application is the same as or different from the second application, and the video capturing mode is a desktop capturing mode or a process capturing mode.

2. The method of claim 1, wherein acquiring the first live broadcast configuration information corresponding to the first process, and live broadcasting the video streaming corresponding to the first process according to the first live broadcast configuration information comprises:

acquiring a preset live broadcast configuration list from a server and acquiring a process name of the first process;

when the process name of the first process is included in the preset live broadcast configuration list, acquiring the first live broadcast configuration information corresponding to the process name of the first process from the preset live broadcast configuration list; and acquiring and live broadcasting the video streaming corresponding to the first process in the video capturing mode corresponding to the first process, wherein the video capturing mode is in the first live broadcast configuration information.

3. The method of claim 2, wherein acquiring the preset live broadcast configuration list from the server and acquiring the process name of the first process comprises:

when user information corresponding to a client includes authorities of an anchor user, acquiring the preset live broadcast configuration list from the server;

according to a clicking operation on a live broadcast starting button, monitoring processes of an operating system; and when it is monitored that the first process is one of the processes of the operating system and the running state of the first process is the activated state, acquiring the process name of the first process.

4. The method of claim 2, wherein when the running state of the second process is the activated state, acquiring the second live broadcast configuration information corresponding to the second process, and detecting the relationship between the first process and the second process comprises:

when the running state of the second process is the activated state, acquiring a process name of the second process;

when the process name of the second process is included in the preset live broadcast configuration list, acquiring the second live broadcast configuration information corresponding to the process name of the second process from the preset live broadcast configuration list;

detecting whether the identification information of the first associated process in the first live broadcast configuration information is matched with the identification information of the second process in the second live broadcast configuration information; and when the identification information of the first associated process is matched with the identification information of the second process, determining that the relationship between the first process and the second process is the association relationship.

5. The method of claim 4, further comprising:

after switching the live broadcasted video streaming corresponding to the first process for the video streaming corresponding to the second process according to the second live broadcast configuration information, when the second process is shut down and the running state of the first process is the activated state, detecting whether identification information of a second associated process in the second live broadcast configuration information is matched with the identification information of the first process in the first live broadcast configuration information, wherein the second associated process belongs to the second process; and when the identification information of the second associated process is matched with the identification information of the first process, switching the live broadcasted video streaming corresponding to the second process for the video streaming corresponding to the first process according to the first live broadcast configuration information.

6. The method of claim 2, wherein when the relationship between the first process and the second process is the association relationship, switching the live broadcasted video streaming corresponding to the first process for the video streaming corresponding to the second process according to the second live broadcast configuration information comprises:

when the relationship between the first process and the second process is the association relationship, temporarily stopping the video streaming corresponding to the first process from being live broadcasted, and acquiring and live broadcasting the video streaming corresponding to the second process in the video capturing mode corresponding to the second process, wherein the video capturing mode is in the second live broadcast configuration information.

7. A device for live video broadcast, comprising:

a memory storing one or more computer-readable program codes; and a processor configured to execute the one or more computer-readable program codes to:

acquire first live broadcast configuration information corresponding to a first process, and live broadcast video streaming corresponding to the first process according to the first live broadcast configuration information, wherein the first process belongs to a first application, the first live broadcast configuration information comprises a video capturing mode corresponding to the first process, identification information of the first process, and identification information of a first associated process having an association relationship with the first process, and the first associated process belongs to the first application;

when a running state of a second process is an activated state, acquire second live broadcast configuration information corresponding to the second process, wherein the second process belongs to a second application, the second live broadcast configuration information comprises a video capturing mode corresponding to the second process and identification information of the second process, and detect a relationship between the first process and the second process according to the first live broadcast configuration information and the second live broadcast configuration information; and when the relationship between the first process and the second process is an association relationship, switch the live broadcasted video streaming corresponding to the first process for video streaming corresponding to the second process according to the second live broadcast configuration information, wherein the relationship between the first process and the second process is the association relationship when the identification information of the first associated process is matched with the identification information of the second process, the first application is the same as or different from the second application, and the video capturing mode is a desktop capturing mode or a process capturing mode.

8. The device of claim 7, wherein the program codes to acquire the first live broadcast configuration information corresponding to the first process, and live broadcast the video streaming corresponding to the first process according to the first live broadcast configuration information further comprise program codes to:
  acquire a preset live broadcast configuration list from a server and acquire a process name of the first process;
  when the process name of the first process is included in the preset live broadcast configuration list, acquire the first live broadcast configuration information corresponding to the process name of the first process from the preset live broadcast configuration list; and
  acquire and live broadcast the video streaming corresponding to the first process in the video capturing mode corresponding to the first process, wherein the video capturing mode is in the first live broadcast configuration information.

9. The device of claim 8, wherein the program codes to acquire the preset live broadcast configuration list from the server and acquire the process name of the first process comprise program codes to:
  when user information corresponding to a client includes authorities of an anchor user, acquire the preset live broadcast configuration list from the server;
  according to a clicking operation on a live broadcast starting button, monitor processes of an operating system; and
  when it is monitored that the first process is one of the processes of the operating system and the running state of the first process is the activated state, acquire the process name of the first process.

10. The device of claim 8, wherein the program codes to when the running state of the second process is the activated state, acquire the second live broadcast configuration information corresponding to the second process, and detect the relationship between the first process and the second process further comprise program codes to:
  when the running state of the second process is the activated state, acquire a process name of the second process;
  when the process name of the second process is included in the preset live broadcast configuration list, acquire the second live broadcast configuration information corresponding to the process name of the second process from the preset live broadcast configuration list;
  detect whether the identification information of the first associated process in the first live broadcast configuration information is matched with the identification information of the second process in the second live broadcast configuration information; and
  when the identification information of the first associated process is matched with the identification information of the second process, determine that the relationship between the first process and the second process is the association relationship.

11. The device of claim 10, wherein the processor is further configured to execute the one or more computer-readable program codes to:
  after switching the live broadcasted video streaming corresponding to the first process for the video streaming corresponding to the second process according to the second live broadcast configuration information,
  when the second process is shut down and the running state of the first process is the activated state, detect whether identification information of a second associated process in the second live broadcast configuration information is matched with the identification information of the first process in the first live broadcast configuration information, wherein the second associated process belongs to the second process; and
  when the identification information of the second associated process is matched with the identification information of the first process, switching the live broadcasted video streaming corresponding to the second process for the video streaming corresponding to the first process according to the first live broadcast configuration information.

12. The device of claim 8, wherein the program codes to when the relationship between the first process and the second process is the association relationship, switch the live broadcasted video streaming corresponding to the first process for the video streaming corresponding to the second process according to the second live broadcast configuration information further comprise program codes to:
  when the relationship between the first process and the second process is the association relationship, temporarily stop the video streaming corresponding to the first process from being live broadcasted, and acquire and live broadcast the video streaming corresponding to the second process in the video capturing mode corresponding to the second process, wherein the video capturing mode is in the second live broadcast configuration information.

* * * * *